United States Patent
Le-Mercier et al.

(10) Patent No.: US 9,611,424 B2
(45) Date of Patent: Apr. 4, 2017

(54) LUMINOPHORES AND CORE-SHELL LUMINOPHORE PRECURSORS

(71) Applicant: RHODIA OPERATIONS, Aubervilliers (FR)

(72) Inventors: Thierry Le-Mercier, Rosny-sous-Bois (FR); Valerie Buissette, Paris (FR)

(73) Assignee: Rhodia Operations, Aubervilliers (FR)

( * ) Notice: Subject to any disclaimer, the term of this patent is extended or adjusted under 35 U.S.C. 154(b) by 0 days.

(21) Appl. No.: 14/063,930

(22) Filed: Oct. 25, 2013

(65) Prior Publication Data

US 2014/0048743 A1     Feb. 20, 2014

Related U.S. Application Data

(63) Continuation of application No. 12/375,266, filed as application No. PCT/EP2007/057480 on Jul. 19, 2007, now Pat. No. 8,663,499.

(30) Foreign Application Priority Data

Jul. 28, 2006  (FR) ..................... 06 06949

(51) Int. Cl.
| | |
|---|---|
| C09K 11/02 | (2006.01) |
| C09K 11/77 | (2006.01) |
| H01L 33/50 | (2010.01) |
| H01J 61/44 | (2006.01) |
| B01J 14/00 | (2006.01) |

(52) U.S. Cl.
CPC .............. *C09K 11/025* (2013.01); *B01J 14/00* (2013.01); *C09K 11/7777* (2013.01); *H01J 61/44* (2013.01)

(58) Field of Classification Search
CPC ... C09K 11/02; C09K 11/025; C09K 11/7777; C09K 11/7787; C01P 2004/61; C01P 2004/62; C01P 2004/64; C01P 2004/84; B82Y 30/00; B82Y 20/00; B82Y 40/00; H01L 33/502; C04B 2235/3225; C04B 2235/3229; C04B 2235/5436; C04B 2235/5445; C04B 35/62815; C04B 35/01; C04B 35/62805; C04B 35/62897
USPC ............ 252/301.4 P, 301.4 R; 428/403, 690; 977/773, 776, 834
See application file for complete search history.

(56) References Cited

U.S. PATENT DOCUMENTS

| | | | |
|---|---|---|---|
| 4,423,349 A | 12/1983 | Nakajima et al. | |
| 5,382,452 A | 1/1995 | Bruno et al. | |
| 5,518,808 A * | 5/1996 | Bruno et al. .................. | 428/323 |
| 5,567,403 A * | 10/1996 | Kimura et al. ............... | 423/263 |
| 5,746,944 A | 5/1998 | Braconnier | |
| 6,822,385 B2 * | 11/2004 | Oskam et al. ................ | 313/486 |
| 8,663,499 B2 * | 3/2014 | Le-Mercier et al. .. | 252/301.4 P |
| 2006/0222757 A1 | 10/2006 | Loureiro et al. | |

FOREIGN PATENT DOCUMENTS

| | | |
|---|---|---|
| CN | 1485397 | 3/2004 |
| EP | 0581621 A1 | 2/1994 |
| EP | 1473347 A1 | 11/2004 |
| WO | 94/14920 A1 | 7/1994 |

OTHER PUBLICATIONS

Yu et al., "Sol-gel synthesis and photoluminescence properties of spherical SiO2@LaPO4:Ce3+/Tb3+ particles with a core-shell structure" Nanotechnology, 2006, pp. 3245-3252, vol. 17, Institute of Physics Publishing, UK.

* cited by examiner

*Primary Examiner* — Matthew E Hoban
*Assistant Examiner* — Lynne Edmondson

(57) ABSTRACT

A novel type of green luminophore containing mixed rare-earth phosphates is produced from precursor particles having a mean diameter ranging from 1.5 to 15 microns; such particles have an inorganic core and a shell of a mixed lanthanum and/or cerium phosphate, optionally doped with terbium, evenly covering the inorganic core with a thickness greater than or equal to 300 nm.

26 Claims, 5 Drawing Sheets

LUMINOPHORES AND CORE-SHELL LUMINOPHORE PRECURSORS

CROSS-REFERENCE TO EARLIER APPLICATIONS

Figure 1:
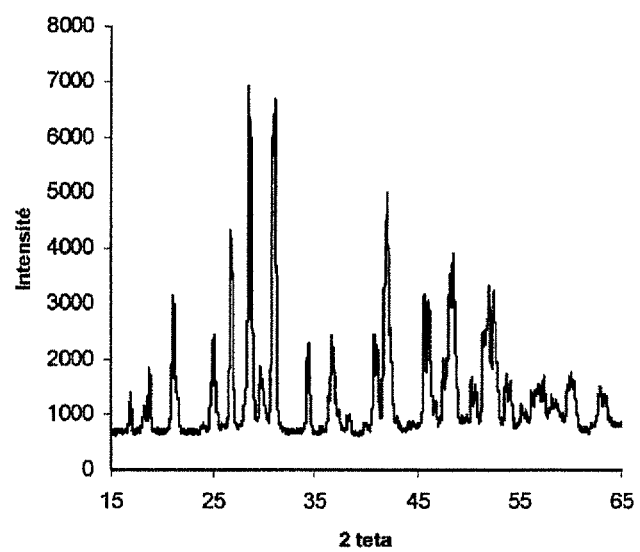

This application is a continuation of Application No. 12/375,266, filed Jan. 27, 2009, which is the national phase of PCT/EP 2007/057480, filed Jul. 19, 2007 and designating the United States (published in the French language on Jan. 31, 2008, as WO 2008/012266 A1; the title and abstract were also published in English), which claims priority under 35 U.S.C. § 119 of FR 0606949, filed Jul. 28, 2006, each hereby expressly incorporated by reference in its entirety and each assigned to the assignee hereof.

The present invention relates to a novel type of green phosphors based on mixed phosphates of lanthanum and/or cerium, doped with terbium, and also to a process for preparing these novel phosphors.

Mixed phosphates of lanthanum and/or cerium, doped with terbium (which will be denoted here by their usual acronym "LAP"), are well-known compounds, which schematically have the structure of lanthanum phosphate $LaPO_4$, where, on some of the sites, the lanthanum cations are substituted with terbium cations, the other lanthanum sites possibly being completely or partly substituted with cerium cations. Within this context, mention may, in particular, be made of mixed phosphates of lanthanum, terbium and cerium (called hereinafter "cerium LAPs") and mixed phosphates of lanthanum and terbium (called hereinafter "cerium-free LAPs"). These mixed phosphates are well known for their luminescence properties. More specifically, they emit a bright green light when they are irradiated by certain high-energy radiation having wavelengths below those of the visible range (UV or VUV radiation for lighting or display systems). Phosphors that exploit this property are commonly used on an industrial scale, for example in trichromatic fluorescent lamps, backlighting systems for liquid crystal displays or in plasma systems.

Within this context, many phosphors based on LAP with various concentrations of lanthanum, cerium and terbium have been developed since the beginning of the seventies, these products furthermore being able to have the optional addition of certain dopant elements (Li, Na, K, Th, B, etc.) with the aim of promoting and/or further increasing their luminescence potential.

Many processes targeting the preparation of LAPs have been described in the literature. On this subject, reference may especially be made to Patents JP 62007785, WO 8204438, JP 62089790, JP 59179578 and JP 62000579 which describe processes known as "dry" processes, that are relatively long and complicated, where a phosphatation of a mixture of oxides or of a mixed oxide is carried out in the presence of diammonium phosphate, or else Patents JP 57023674, JP 60090287 and JP 62218477 or U.S. Pat. No. 3,507,804 which describe "wet" processes, that are more direct, where a synthesis, in liquid medium, of a mixed phosphate of rare-earth metals or of a mixture of phosphates of rare-earth metals is carried out.

These various syntheses result in mixed phosphates that require, for their application in luminescence, a heat treatment at high temperature, around 1100° C., under a reducing atmosphere, generally in the presence of fluxing agents. Indeed, so that the mixed phosphate is an effective green phosphor, it is necessary that the terbium and, where appropriate, the cerium are in the 3+ oxidation state.

The aforementioned dry and wet methods have the drawback of resulting in phosphors of uncontrolled, especially insufficiently narrow, particle size which is further accentuated by the necessity of the high-temperature thermal activation treatment, with flux and under a reducing atmosphere, which generally causes further disturbances in the particle size, thus resulting in phosphor particles that are not homogeneous in size, which may in addition contain greater or smaller amounts of impurities linked especially to the use of the flux, and that in the end exhibit insufficient luminescence performance.

To overcome these drawbacks, a process has been proposed in Application EP 581 621 that makes it possible to improve the particle size of the LAPs, with a narrow particle size distribution, which results in particularly high-performance phosphors. In particular, obtaining particles having a narrow particle size allows the production of coatings made of thin homogeneous layers in fluorescent lamps. On the other hand, the narrow particle size obtained makes it possible to optimize the luminescence properties of the phosphor, especially in terms of brightness. Furthermore, the process of EP 581 621 results in precursors which may be converted to an effective phosphor by a heat treatment that does not necessarily require the use of flux and/or a reducing atmosphere.

Considering these improvements, the LAP particles prove to be very good phosphors. Nevertheless, outside of their various advantages, a problem remains, namely that of their particularly high cost, linked especially to the use of terbium.

One object of the present invention is to provide phosphors having the advantages of the phosphors currently known, of the type of those described in EP 581 621, but having a lower cost.

For this purpose, according to a first aspect, the present invention provides novel phosphor precursors (P) especially based on a mixed phosphate of lanthanum and/or cerium, optionally doped with terbium (LAP), comprising particles having an average diameter between 1.5 and 15 microns, typically between 3 and 10 microns, these particles comprising:

a mineral core, generally based on a phosphate or a mineral oxide; and a shell based on a mixed phosphate of lanthanum and/or cerium, optionally doped with terbium (LAP), homogeneously covering the mineral core over a thickness greater than or equal to 300 nm, especially between 0.3 and 1 micron, for example 0.5 to 0.8 micron.

The invention also relates to novel phosphors (L) such as are obtained by converting the preceding precursors by heat treatment at a temperature above 900° C. These phosphors (L), having a general composition relatively similar to that of the base precursors, comprise particles having an average diameter between 1.5 and 15 microns, typically between 3 and 10 microns, these particles comprising:

a mineral core, generally based on a phosphate or a mineral oxide; and a shell based on a mixed phosphate of lanthanum and/or cerium, optionally doped with terbium (LAP), homogeneously covering the mineral core, over a thickness greater than or equal to 300 nm, typically between 0.3 and 1 micron.

They have optimized luminescence properties relative to the precursors (P).

In particular, the phosphors (L) of the invention generally have very good brightness, similar to that of the phosphors described, for example, in Application EP 581 621.

The brightness of a phosphor may be quantified by the conversion yield of the phosphor, which corresponds to a ratio of the number of photons emitted by a phosphor to the number of photons that form the excitation beam. The conversion yield of a phosphor is evaluated by measuring, in the visible range of the electromagnetic spectrum, the emission of a phosphor under an excitation in the UV or VUV range generally at a wavelength below 280 nm. The value of the brightness obtained (emission intensity integrated between 380 and 780 nm) is then compared with that of a reference phosphor.

The phosphors (L) of the invention generally have conversion rates similar to those of the phosphors from Example 3 of EP 581 621.

In the precursors (P) and the phosphors (L) of the invention, considering the specific presence of the mineral core, which occupies a large part of the volume of the particles, the amount of LAP used is reduced relative to the bulk phosphor particles currently known, which considerably reduces their cost.

Nevertheless, apart from this difference in internal structure, the phosphors of the invention have properties similar to those of LAP-based phosphors currently known, of the type of those described in EP 581 621.

In particular, it turns out that the presence of the non-phosphor core does not impair—or only slightly impairs—the luminescent properties of the phosphors (L) of the invention. In most cases, luminescence properties (and in particular brightness) are obtained that are similar to those obtained with bulk particles. Within this context, the studies of the inventors have made it possible to establish that an LAP shell of thickness greater than or equal to 300 nm, more preferentially at least 400 nm, deposited on a non-phosphor material provides luminescence properties similar to a bulk material of the same size and geometry made up solely of LAP.

Furthermore, with an average particle diameter of 1.5 to 15 microns, for example between 3 and 10 microns, the phosphors (L) of the invention have an average particle diameter of the order of those of the phosphor particles currently used.

In other words, the phosphors (L) of the invention, having a core/shell structure, may be considered schematically as similar to the particularly advantageous phosphors currently known, of the type of those described in EP 581 621, but in which the innermost LAP, useless for luminescence properties, is replaced with a less expensive mineral material.

The inventors have now found that it is actually possible to obtain, in an economical, reproducible and controlled manner, phosphors (L) having the structure of the aforementioned type, namely including a mineral core covered by a homogeneous LAP shell of thickness greater than 300 nm. The present invention gives, for the first time, means of attaining such core/shell structures.

For this purpose, the invention more specifically provides a process for preparing the aforementioned phosphor precursors (P), which comprises the successive steps (A) and (B) below, in which:

(A) an aqueous solution (s) of soluble lanthanum and/or cerium, and optionally terbium, salts is gradually and continuously added, with stirring, to an aqueous medium (m) having an initial pH ($pH^0$) between 1 and 5, more particularly from 1 to 2, and initially comprising:
particles ($p^0$) based on a mineral material, in the dispersed state; and
phosphate ions, while maintaining the pH of the reaction medium at an approximately constant value during the precipitation reaction of the mixed phosphate which ensues, with variations in the pH of at most 0.5 pH units, on both sides of the $pH^0$ value, whereby particles are obtained that comprise a core based on a mineral material, deposited at the surface of which is a mixed phosphate of lanthanum and/or cerium, and optionally terbium;

then (B) the particles obtained are separated from the reaction medium, and are heat-treated at a temperature of 400 to 900° C., preferably at least equal to 600° C.

The invention also provides a process for preparing phosphors (L) from the aforementioned precursors (P), which comprises a step (C) in which:

(C) the precursor (P) is heat-treated at a temperature above 900° C., advantageously of at least 1000° C.

The very specific conditions of the process of the invention result, at the end of step (B), in a preferential (and in most cases quasi-exclusive, even exclusive) location of the mixed phosphate formed on the surface of the particles ($p^0$), in the form of a homogeneous shell.

The mixed phosphate may precipitate to form different morphologies. Depending on the preparation conditions, it is especially possible to observe the formation of acicular particles forming a homogeneous covering on the surface of the particles ($p^0$) (morphology known as "sea urchin spine morphology", see FIG. 3) or the formation of spherical particles (morphology known as "cauliflower morphology", see FIG. 7).

Under the effect of the heat treatment of step (B), the morphology is essentially retained. In step (C), the morphology may, depending on the conditions, change to become smoother.

Various advantageous embodiments and features of the process of the invention and of the precursors (P) and the phosphors (L) will now be described in greater detail.

Step (A)

In step (A) of the process of the invention, direct precipitation of a mixed phosphate of lanthanum and/or cerium and terbium is optionally carried out, at a controlled pH, by making the solution (s) of soluble lanthanum and/or cerium, and terbium salts react with the medium (m) containing phosphate ions.

Furthermore, characteristically the precipitation in step (A) is carried out in the presence of particles ($p^0$), initially present in the dispersed state in the medium (m), to the surface of which the mixed phosphate that precipitates will be attached, given the specific conditions used in step (A), and which are generally held in the dispersed state throughout step (A), typically by leaving the medium being stirred.

The exact nature of the particles ($p^0$) may vary over a relatively large range. However, they are advantageously particles of isotropic, preferably approximately spherical, morphology.

The material of the particles ($p^0$) may especially be an oxide or a phosphate.

Among oxides, mention may in particular be made of the oxides of zirconium, zinc, titanium, aluminium and rare-earth metals (especially $Y_2O_3$, $Gd_2O_3$ and $CeO_2$).

Among phosphates, mention may be made of phosphates of rare-earth elements such as lanthanum phosphates, lanthanum cerium phosphates, (La, Ce, Tb) phosphates, but less doped with Tb ions than the shell material, yttrium phosphates, and rare-earth or aluminium polyphosphates.

Furthermore, other mineral compounds are suitable such as vanadates ($YVO_4$), germanates, silica, silicates, tungstates, molybdates, aluminates ($BaMgAl_{10}O_{17}$), sulphates ($BaSO_4$), borates ($YBO_3$, $GdBO_3$), carbonates and titanates (such as $BaTiO_3$).

Finally, compounds derived from the preceding compounds may be suitable, such as mixed oxides, especially mixed rare-earth oxides, for example the mixed zirconium cerium oxides, mixed phosphates, especially mixed rare-earth phosphates, and phosphovanadates.

In particular, the material of the particles ($p^0$) may have particular optical properties, especially UV reflective properties.

According to one embodiment, the particles ($p^0$) are based on a phosphate of rare-earth metals such as lanthanum, cerium, yttrium or gadolinium or one of their mixed phosphates. According to one particular embodiment, the particles ($p^0$) are based on lanthanum phosphate.

According to another embodiment, the particles ($p^0$) are based on an oxide of one or more metals. Particularly suitable are particles based on an oxide of rare-earth metals, such as lanthanum, cerium, yttrium, scandium or gadolinium or one of their mixed oxides; an oxide of metals such as titanium, zirconium, silicon and aluminium; aluminates of alkaline-earth metals, such as barium and/or magnesium aluminates, such as $MgAl_2O_4$, $BaAl_2O_4$ or $BaMgAl_{10}O_{17}$.

The expression "based on" is understood to denote compositions comprising at least 50%, preferably at least 70% and more preferably at least 80%, even 90% by weight of the material in question. According to one particular mode, the particles ($p^0$) may be mainly formed of said material (i.e. having a content of at least 95% by weight, for example at least 98%, or even at least 99% by weight).

As for the term "rare-earth metals", this denotes, within the context of the present description, an element chosen from yttrium, scandium and the lanthanides, the lanthanides being the metallic elements whose atomic number is between 57 (lanthanum) and 71 (lutetium) inclusive.

Regardless of their exact nature, the particles ($p^0$) advantageously initially have an average diameter between 0.5 and 14 microns, preferably between 2 and 9 microns.

The average diameter to which reference is made is the average, by volume, of the diameters of a population of particles.

The particle size values given here and for the rest of the description are measured by means of a laser particle size analyser, especially of the Coulter or Malvern laser type.

Furthermore, the particles ($p^0$) preferably initially have a low dispersion index, typically of less than 0.6, preferably of less than 0.5, for example of less than 0.4.

The term "dispersion index" for a population of particles is understood to mean, within the context of the present description, the ratio I as defined below:

$$I = (\emptyset_{84} - \emptyset_{16})/(2 \times \emptyset_{50}),$$

where: $\emptyset_{84}$ is the diameter of the particles for which 84% of the particles have a diameter below $\emptyset_{84}$;

$\emptyset_{16}$ is the diameter of the particles for which 16% of the particles have a diameter below $\emptyset_{16}$; and $\emptyset_{50}$ is the diameter of the particles for which 50% of the particles have a diameter below $\emptyset_{50}$.

The definition of the dispersion index given here for the particles also applies for the rest of the description to the precursors (P) and to the phosphors (L).

The diameters may be measured using a commercially available laser particle size analyser.

Generally, particles ($p^0$) will advantageously be chosen having a monodisperse size distribution which is the narrowest possible around the average value.

According to one embodiment, the particles ($p^0$) used may be particles based on undoped lanthanum phosphate. These particles ($p^0$) may be prepared by known processes, for example that described in EP 0 581 621.

Several advantageous embodiments of the invention will now be described below.

According to a first embodiment, the particles ($p^0$) used are dense particles, thereby corresponding in fact to particles based on a generally well-crystallized material or else based on a material having a low specific surface area.

The term "specific surface area" is understood to mean the BET specific surface area determined by krypton adsorption. The surface area measurements given in the present description were carried out on an ASAP2010 instrument after degassing the powder for 8 h at 200° C.

The term "low specific surface area" is understood to mean a specific surface area of at most 1 $m^2/g$, more particularly at most 0.6 $m^2/g$.

According to another embodiment, the particles ($p^0$) used are based on a temperature-stable material. By this is meant a material having a melting point at a high temperature, which does not degrade into a by-product hampering the application as a phosphor at this same temperature and which remains crystallized, and therefore is not converted into an amorphous material, again at this same temperature. The high temperature intended here is that given in the case of step (C), i.e. a temperature of at least greater than 900° C., preferably at least greater than 1000° C. and even more preferably at least 1200° C.

The third embodiment consists in using particles that combine the features of the previous two embodiments, therefore particles based on a material that has a low specific surface area and is temperature-stable.

Using particles ($p^0$) according to at least one of the embodiments described above offers many advantages. Firstly, the core/shell structure of the precursor (P) is particularly well preserved in the phosphor L that results therefrom. This makes it possible to obtain maximum cost advantage.

Moreover, it has been found that the phosphors (L) obtained from the phosphor precursors (P), in the manufacture of which particles ($p^0$) were used according to at least one of the aforementioned embodiments, exhibited photoluminescence yields that are not only identical but in certain cases higher than those of a phosphor consisting of an LAP of the same composition but not having the core/shell structure.

The dense particles ($p^0$) may be based on the materials described above, especially oxides and phosphates. Mention may more particularly be made of the following: densified lanthanum phosphate and densified yttrium phosphate; aluminas, especially single-crystal aluminas and single-crystal alpha-alumina; aluminates, such as barium aluminate and magnesium aluminate; borates, especially yttrium borate; and zirconium oxide.

These materials may be densified in particular using the known technique of molten salts. This technique consists in heating the material to be densified to a high temperature, for example at least 900° C., preferably in a reducing atmosphere, for example an argon/hydrogen mixture, in the presence of a salt, which may be chosen from chlorides (sodium chloride or potassium chloride for example), fluorides (for example lithium fluoride), borates (lithium borate) or boric acid.

In step (A) of the process of the invention, the order for introducing the reactants is important.

In particular, the solution (s) of the soluble rare-earth metal salts must specifically be introduced into a medium (m) that initially contains the phosphate ions and the particles ($p^0$).

In the solution (s), the concentrations of the lanthanum, cerium and terbium salts in the aqueous solution (s) may vary between wide limits. Typically, the total concentration of the three rare-earth metals may be between 0.01 mol/l and 3 mol/l.

Suitable soluble lanthanum, cerium and terbium salts in the solution (s) are especially water-soluble salts, such as for example nitrates, chlorides, acetates, carboxylates, or a mixture of these salts. The preferred salts according to the invention are nitrates.

The solution (s) may comprise, in addition, other metal salts, such as for example salts of other rare-earth metals, of alkali elements, of thorium, of boron or of other elements, to obtain LAPs doped with these elements.

The phosphate ions initially present in the medium (m) and intended to be reacted with the solution (s) may be introduced into the medium (m) in the form of pure compounds or compounds in solution, such as for example phosphoric acid, alkali metal phosphates or phosphates of other metallic elements forming a soluble compound with the anions associated with the rare-earth metals.

According to one preferred embodiment of the invention, the phosphate ions are initially present in the mixture (m) in the form of ammonium phosphates. According to this embodiment, the ammonium cation decomposes during the heat treatment in step (B), thus making it possible to obtain a high-purity mixed phosphate. Among the ammonium phosphates, diammonium or monoammonium phosphate are particularly preferred compounds for implementing the invention.

The phosphate ions are advantageously introduced in a stoichiometric excess into the medium (m), relative to the total amount of lanthanum, cerium and terbium present in the solution (s), i.e. with an initial phosphate/(La+Ce+Tb) molar ratio greater than 1, preferably between 1.1 and 3, this ratio typically being less than 2, for example between 1.1 and 1.5.

According to the process of the invention, the solution (s) is gradually and continuously introduced into the medium (m).

Moreover, according to another important feature of the process of the invention, which makes it possible, in particular, to obtain a homogeneous coating of the particles ($p^0$) by the mixed LaCeTb phosphate, the initial pH ($pH^0$) of the solution containing the phosphate ions is from 1 to 5, more particularly from 1 to 2. Furthermore, it is preferably subsequently kept approximately at this $pH^0$ value for the whole duration of the addition of the solution (s), while keeping the pH systematically between ($pH^0-0.5$) and ($pH^0+0.5$).

To achieve these pH values and to ensure the required pH control, it is possible to add to the medium (m), basic or acidic compounds or buffer solutions, prior to and/or together with the introduction of the solution (s).

As suitable basic compounds according to the invention, mention may be made, by way of example, of metal hydroxides (NaOH, KOH, $CaOH_2$, etc.) or else ammonium hydroxide, or any other basic compound of which the species that constitute it will not form any precipitate during their addition into the reaction medium, by combination with one of the species furthermore contained in this medium, and that allow control of the pH of the precipitation medium.

Moreover, it should be noted that the precipitation in step (A) is carried out in an aqueous medium, generally using water as the only solvent. However, according to another embodiment that can be envisaged, the medium from step (A) may optionally be an aqueous-alcoholic medium, for example a water/ethanol medium.

Furthermore, the processing temperature of step (A) is generally between 10° C. and 100° C.

Step (A) may comprise, in addition, a maturing step, at the end of the addition of all of the solution (s) and prior to step (B). In this case, this maturing is advantageously carried out by leaving the medium obtained to be stirred at the reaction temperature, advantageously for at least 20 minutes after the end of the addition of the solution (s).

Step (B)

In step (B), the surface-modified particles such as obtained at the end of step (A) are first separated from the reaction medium. These particles may be easily recovered at the end of step (A), by any means known per se, in particular by simple filtration, or optionally by other types of solid/liquid separation. Indeed, under the conditions of the process according to the invention, a supported LAP mixed phosphate is precipitated which is not gelatinous and can be easily filtered.

The recovered particles may then advantageously be washed, for example with water, for the purpose of ridding them of possible impurities, especially adsorbed nitrate and/or ammonium groups.

At the end of these separation and if necessary washing steps, step 5b) comprises a specific heat treatment step, at a temperature between 400 and 900° C. This heat treatment comprises a calcination, usually in air, preferably carried out at a temperature of at least 600° C., advantageously between 700 and 900° C.

The Phosphor Precursors (P)

At the end of step (B), a particulate precursor (P) is obtained, where the particles have a particular morphology, i.e. including a mineral core covered by a homogeneous coating formed of crystals of a mixed lanthanum and/or cerium phosphate, optionally doped with terbium.

Generally, in the constituent particles of the precursors (P) such as obtained according to the invention, the core generally has an average diameter of around that of the particles ($p^0$) used to form it, each of the cores of the constituent particles of the precursor (P) being schematically composed of one of the initial particles ($p^0$) in the individual state (or else optionally of an aggregation of at the very most a few particles). Thus, the mineral core of the constituent particles of the precursor (P) generally has an average diameter of 0.5 to 15 microns (for example from 0.5 to 14 microns), typically of around 1 to 10 microns (especially between 2 and 9 microns).

The composition of the core is itself generally identical or very close to the composition of the particles ($p^0$). Thus, the mineral core of the particles of a precursor (P) according to the invention is advantageously based on a phosphate or a mineral oxide, and more particularly a rare-earth metal phosphate, such as undoped lanthanum phosphate, or an aluminium oxide. According to one specific embodiment, the mineral core of the particles of the precursor (P) is mainly composed of lanthanum phosphate $LaPO_4$.

According to the embodiments described above, which correspond to the case in which dense particles ($p^0$) and/or particles made of a temperature-stable material are used, the mineral core of the particles of the precursor (P) is a dense core and/or made of the same temperature-stable material, i.e. in particular a core having a specific surface area of at most 1 m²/g, more particularly at most 0.6 m²/g.

On the surface of their mineral core, the precursors (P) comprise a layer based on a mixed lanthanum and/or cerium phosphate, optionally doped with terbium, having an average thickness generally between 0.3 and 1 micron, for example between 0.5 and 0.8 micron.

The dimensions of the core and the shell of the precursors (P) may especially be measured from transmission electron micrographs of particle sections.

The LAP is deposited on the precursor (P) particles of the invention in the form of a homogeneous layer. The term "homogeneous layer" is understood to mean a continuous layer, completely covering the core and of which the thickness is preferably never less than 300 nm. This homogeneity of the mixed LAP phosphate distribution is especially visible on scanning electron micrographs. X-ray diffraction (XRD) measurements demonstrate the presence of two separate compositions of the core and the shell.

The mixed phosphate (LAP) which is present in the shell of the precursor (P) particles such as obtained at the end of step (B) usually corresponds to the general formula (I) below:

$$La_{(1-x-y)}Ce_xTb_yPO_4 \quad (I)$$

in which:
x, optionally zero, is between 0 and 0.95 inclusive;
y is between 0.05 and 0.3 inclusive; and
the sum (x+y) is less than or equal to 1.

As a general rule, it is preferred that the sum (x+y) remains strictly below 1, that is to say that the compound of formula (I) contains some lanthanum. It is not however excluded that this sum could be equal to 1, in which case the compound (I) is a mixed phosphate of cerium and terbium, free from lanthanum.

According to one particularly advantageous embodiment, the mixed phosphate that is present on the outer layer of the precursor (P) particles is a cerium LAP which corresponds to the formula (Ia) below:

$$La_{(1-x-y)}Ce_xTb_yPO_4 \quad (Ia)$$

in which:
x is between 0.1 and 0.5 inclusive;
y is between 0.1 and 0.3 inclusive; and
the sum (x+y) is between 0.4 and 0.6.

According to another embodiment which may be envisaged, the mixed phosphate that is present on the outer layer of the precursor (P) particles is a cerium-free LAP which corresponds to the formula (Ib) below:

$$La_{(1-y)}Tb_yPO_4 \quad (Ib)$$

in which:
y is between 0.05 and 0.3 inclusively.

According to yet another conceivable embodiment, the mixed phosphate present on the outer layer of the precursor (P) particles is a terbium-free LAP which corresponds to the following formula (Ic):

$$La_{(1-y)}Ce_yPO_4 \quad (Ic)$$

in which:
y is between 0.01 and 0.3 inclusive.

It should be noted that the layer may comprise, besides the mixed phosphates described above, other compounds, for example polyphosphates of rare-earth metals, generally in a minor amount that does not exceed 5% for example.

According to one particular embodiment, the mixed phosphate may comprise other elements that conventionally have a role, in particular, of promoting the luminescence properties or of stabilizing the degrees of oxidation of the cerium and terbium elements; by way of example, mention may more particularly be made of the alkali metals (Li, Na, K, in particular), thorium and boron.

It should be emphasized that, usually, in the precursor (P) particles, approximately all the mixed LAP phosphate present is located in the layers surrounding the core.

The precursor (P) particles advantageously have, furthermore, an overall average diameter between 1.5 and 15 microns, for example between 3 and 8, more particularly between 3 and 6 or between 4 and 8 microns.

Moreover, the precursor (P) particles advantageously have a low dispersion index, this dispersion index generally being less than 0.6, preferably at most 0.5.

Step (C)

In step (C) of the process of the invention, the precursor (P) particles are converted to efficient green phosphors by a heat treatment at a temperature at more than 900° C., and advantageously of around at least 1000° C.

Although the precursor (P) particles may themselves have intrinsic luminescence properties, these properties are greatly improved by the heat treatment of step (C).

The consequence of this heat treatment is especially to convert all the Ce and Tb species to their (+III) oxidation state. It may be carried out using means known per se for the heat treatment of phosphors, in the presence or absence of a fluxing agent (also known as a "flux"), with or without a reducing atmosphere, depending on the case.

The precursor (P) particles of the invention have the particularly remarkable property of not clumping during the calcination, that is to say that they do not generally have a tendency to agglomerate and therefore to end up in a final form of coarse aggregates having a size of 0.1 to several mm for example; it is therefore not necessary to carry out prior milling of the powders before subjecting these powders to the conventional treatments intended for obtaining the final phosphor, which also constitutes one advantage of the invention.

According to a first variant, step (C) is carried out by subjecting the precursor (P) particles to a heat treatment in the presence of a flux.

By way of flux, mention may be made of lithium fluoride, lithium tetraborate, lithium chloride, lithium carbonate, lithium phosphate, potassium chloride, ammonium chloride, boron oxide, boric acid and ammonium phosphates, and also mixtures thereof.

The flux is mixed with the particles (P) to be treated, then the mixture is heated to a temperature preferably between 1000° C. and 1300° C.

The heat treatment may be carried out under a reducing atmosphere ($H_2$, $N_2/H_2$ or $Ar/H_2$ for example) or not under a reducing atmosphere ($N_2$, Ar or air).

According to a second variant of step (C), the particles (P) are subjected to the heat treatment in the absence of flux.

This variant may, in addition, be either carried out under a reducing atmosphere or non-reducing atmosphere, in particular under an oxidizing atmosphere such as for example air, without having to use expensive reducing atmospheres. Of course, it is quite possible, although less economical, to also use, still within the scope of this second variant, reducing or non-reducing atmospheres.

One specific embodiment of step (C) consists in treating the precursor (P) at a temperature of 1000 to 1300° C. under an atmosphere of argon and hydrogen.

This type of treatment is known in itself, and conventionally used in processes for developing phosphors, especially for adapting the latter to the desired application (morphology of the particles, surface state, brightness, for example).

After treatment, the particles are advantageously washed, so as to obtain a phosphor that is as pure as possible and is in a deagglomerated state or slightly agglomerated state. In the latter case, it is possible to deagglomerate the phosphor by making it undergo a deagglomeration treatment under mild conditions.

The aforementioned heat treatments make it possible to obtain phosphors (L) which retain a core/shell structure and a particle size distribution very close to those of the precursor (P) particles.

Moreover, the heat treatment from step (C) may be carried out without inducing phenomena that are sensitive to the diffusion of the Ce and Tb species from the outer phosphor layer towards the core.

According to one specific embodiment of the invention that can be envisaged, it is possible to carry out in one and the same step, the heat treatments of steps (B) and (C). In this case, the phosphor (L) is obtained directly without stopping at the precursor (P).

The Phosphors (L)

The phosphors (L) of the type obtained at the end of step (C), by heat treatment of the precursors (P), specifically comprise an outer shell based on a mixed LAP phosphate. This mixed phosphate advantageously corresponds to one of the aforementioned formulae (I), (Ia) or (Ib), the phosphor (L) in this case being obtained by heat-treating a precursor based on the corresponding phosphate.

Three types of phosphors according to the invention can be distinguished, depending on the composition of the mixed phosphate of the shell, namely:

phosphors called "cerium phosphors" in which the mixed phosphate of the shell is a cerium LAP (phosphate of aforementioned formula (Ia), for example);

phosphors called "cerium-free phosphors" in which the mixed phosphate of the shell is an LAP containing no cerium (phosphate of aforementioned formula (Ib), for example); and phosphors called "terbium-free phosphors" in which the mixed phosphate of the shell is an LAP containing no terbium (phosphate of aforementioned formula (Ic), for example).

The mixed phosphate present on the outer layer of the phosphors (L) of the invention may optionally comprise a dopant element reinforcing its luminescence properties, especially a promoter of the luminescence properties or for stabilizing the degrees of oxidation of the cerium and terbium elements. By way of example, mention may more particularly be made of the alkali metals (Li, Na, K, etc.), thorium and boron.

As for the core of the phosphors (L) of the invention, this generally has approximately the same composition as the particles ($P^0$) initially introduced into the medium (m) in step (A). In some cases, it is optionally possible to note a partial migration of certain species (Ce and Tb for example) from the shell towards the core, but these partial diffusion phenomena may in most cases be avoided under the conditions of the process of the invention.

According to the embodiments described above, which correspond to the case in which dense particles ($p^0$) and/or particles made of a temperature-stable material are used, the mineral core of the particles of the phosphor (L) is a dense core and/or a core made of the same temperature-stable material, that is to say especially a core having a specific surface area of at most 1 $m^2/g$, more particularly at most 0.6 $m^2/g$. In the case of these embodiments, the abovementioned partial migration of certain species is generally not observed.

As indicated above, step (C) has the effect of improving the luminescence properties and in particular brightness, especially by mainly reducing all the metallic species Ce and Tb in the +IV oxidation state initially present in the precursors (P) to the state of species in the +III oxidation state. Thus, the phosphors (L) are generally distinguished from the precursors (P) by their composition, where the species Ce and Tb in the +IV oxidation state are predominantly absent. It is possible to assess the presence or absence of cerium and/or terbium in the +4 oxidation state by a surface analysis of the products by the technique known as XPS which is for example described by Praline et al., in Journal of Electron Spectroscopy and Related Phenomena, 21 (1981), pp. 17-30 and 31-46.

Nevertheless, the phosphors (L) generally retain a composition relatively close to those of the precursors (P), with a similar average particle diameter (between 1.5 and 15 microns, for example between 3 and 8, more particularly between 3 and 6 or between 4 and 8 microns), and an analogous structure (core having an average diameter of around 0.5 to around 15 microns, typically of the order of 1 to 10 microns, covered by a layer based on an LAP of average thickness of the order of 0.3 to 1 micron, for example between 0.5 and 0.8 microns. The term "average diameter" of the particles of a phosphor is understood, in the meaning of the present description, to mean the average diameter as measured on an aqueous dispersion of the phosphor, by means of a laser particle size analyser, especially of the Coulter or Malvern laser type. Here too, the core/shell structure of the phosphors may be demonstrated by transmission electron micrographs of particle sections, combined with X-ray diffraction diagrams.

Furthermore, the phosphors (L) usually have a very homogeneous particle size, with a dispersion index below 0.6, for example below 0.5. More generally, the phosphors (L) of the invention may advantageously have a particle size that is monodisperse and narrow around an average value.

As emphasized above in the description, the phosphors (L) of the invention have, in addition, luminescence and brightness properties similar to those of the phosphors described in Patent EP 581 621. They therefore form an economically advantageous alternative to these phosphors.

Furthermore, the phosphors (L) of the invention generally have a very good luminescence, similar to that of the phosphors described, for example, in Application EP 581 621.

Advantageously, the phosphor has, relative to a mixed phosphate of La and/or of Ce doped with Tb and having a composition, expressed by weight, of 55% La oxide, 30% Ce oxide and 15% Tb oxide, a substantially identical or greater photoluminescence yield and a Tb content at least 5 wt %, more particularly at least 10 wt %, lower than that of said mixed phosphate.

Preferably, the Tb content is at least 30 wt %, more particularly at least 40 wt % and preferably 50 wt %, lower than that of said mixed phosphate.

The expression "substantially identical photoluminescence yield" is understood to mean that the values measured lie within the confidence interval, taking into account the measurement uncertainties. The photoluminescence yield may especially be measured by integration of the emission spectrum between 450 and 700 nm, under excitation at 254 nm.

Moreover, the luminescence properties of the phosphors (L) of the invention are generally stable over time. This stability may be assessed by means of tests known in the field of phosphors by the term "baking" test. This test consists in calcining, at 600° C., for 10 minutes and in air, a thin layer of phosphor deposited with a conventional binder on an inert support (glass), and in measuring the new conversion yield of the phosphor thus treated. For the phosphors according to the invention, usually the drop in conversion yield does not exceed 1% to 2% in terms of relative value.

The use of the phosphors (L) of the invention to provide a green luminescence in various devices also forms one particular subject of the invention.

The phosphors of the invention (L) have intense luminescence properties in the green for electromagnetic excitations corresponding to the various absorption fields of the product.

Thus, the phosphors based on cerium and terbium of the invention may be used in lighting or display systems having an excitation source in the UV range (200-280 nm), for example around 254 nm. In particular, note will be made of mercury vapour trichromatic lamps, lamps for backlighting liquid crystal systems, in tubular or flat form (LCD Back Lighting). In particular, they have a suitable particle size, for example around 3 to 5 µm, especially from 4 to 5 µm, and also a high brightness under UV excitation, and an absence of luminescence loss following a thermal post-treatment. Their luminescence is, in particular, stable under UV at relatively high temperatures (100-300° C.).

The terbium-based phosphors of the invention are also good candidates as green phosphors for VUV (or "plasma") excitation systems, such as for example plasma screens and trichromatic lamps without mercury, especially xenon excitation lamps (tubular or flat). The phosphors of the invention have a strong green emission under VUV excitation (for example around 147 nm and 172 nm), due to a strong absorption of the matrix of rare-earth metal phosphate, and also terbium ions. The phosphors are stable under VUV excitation. They have, in addition, a suitable particle size, for example around 2.5 and 4 µm.

The phosphors of the invention may also be used as green phosphors in devices for excitation by light-emitting diode. They may especially be used in systems that can be excited in the near UV.

They may also be used in UV excitation marking systems.

The phosphors of the invention may be applied in the lamp and screen systems by well-known techniques, for example by screen printing, electrophoresis or sedimentation.

They may also be dispersed in organic matrices (for example plastic matrices or matrices of polymers that are transparent under UV, etc.), mineral matrices (for example silica matrices) or mixed organo-mineral matrices.

The phosphors (L) of the invention have luminescence properties under an electromagnetic excitation corresponding to an absorption band of the higher-energy material. Thus, cerium has a band around 254 nm, terbium absorbs around 172 nm and the phosphate matrix has a band around 147 nm.

Consequently, the phosphors of the invention may be used in UV excitation devices, especially in trichromatic lamps, especially mercury vapour trichromatic lamps, lamps for backlighting liquid crystal systems, plasma screens, xenon excitation lamps, devices for excitation by light-emitting diodes and UV excitation marking systems.

The invention also relates, according to another aspect, to the luminescent devices of the aforementioned type, comprising the phosphors (L) of the invention as a source of green luminescence.

Figure 2:
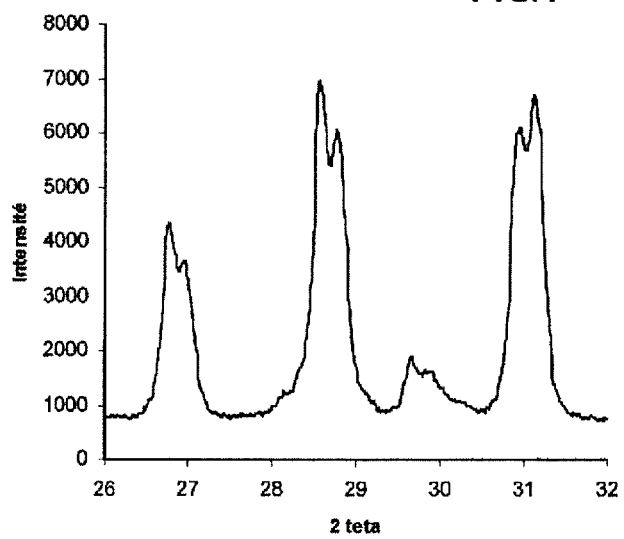
Figure 3:
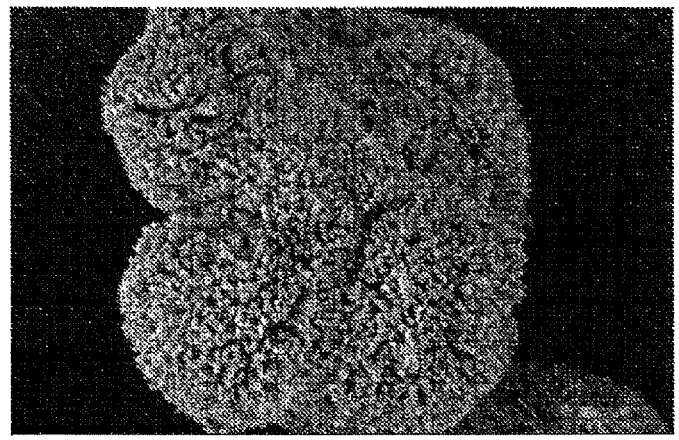
Figure 4:
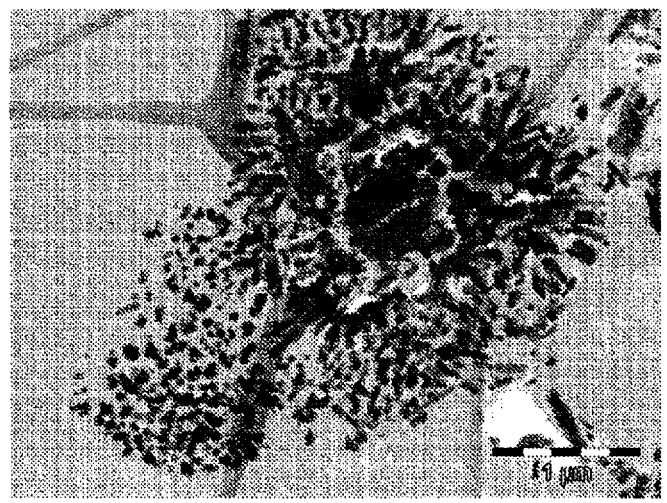
Figure 5:
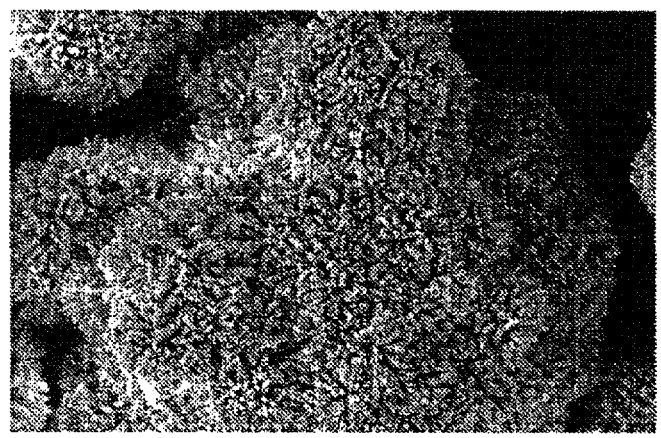
Figure 6:
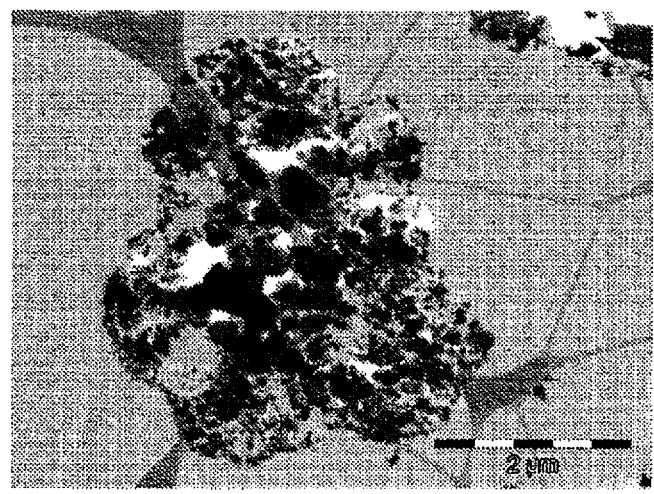
Figure 7:
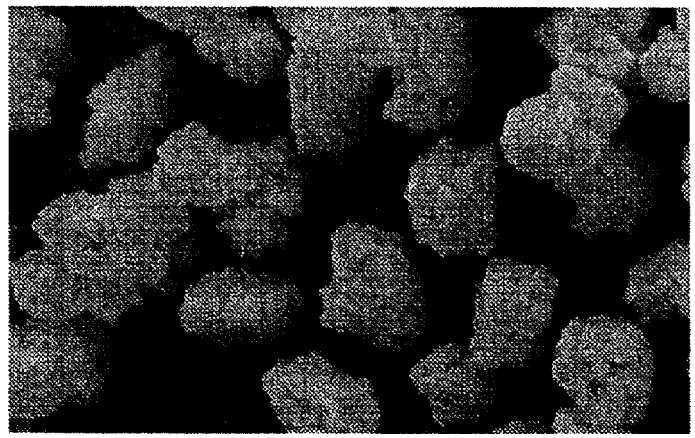
Figure 8:
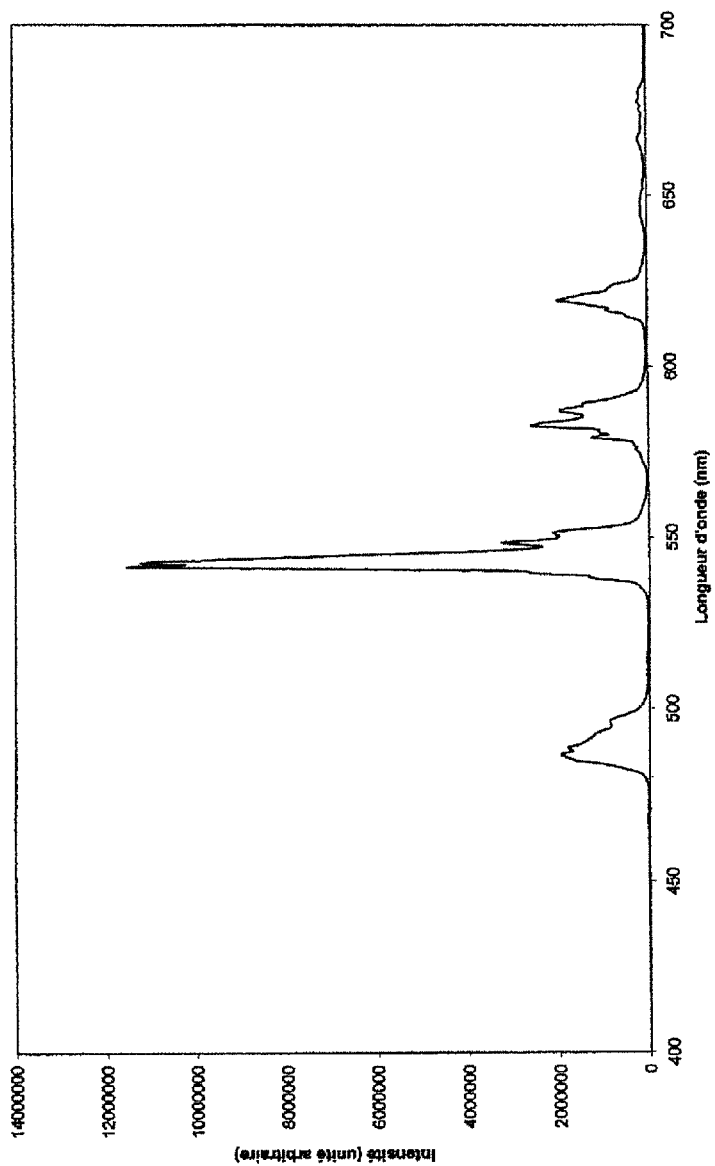

The invention is explained in greater detail by means of the examples below and the figures which show:

FIG. 1: a diffraction diagram of the powder obtained in Example 3;

FIG. 2: an enlargement of the diffraction diagram of the powder obtained in Example 3;

FIG. 3: an SEM micrograph of the powder obtained in Example 3;

FIG. 4: a TEM micrograph of a section produced by ultramicrotomy of a grain of the powder obtained in Example 3;

FIG. 5: an SEM micrograph of the powder obtained in Example 4;

FIG. 6: a TEM micrograph of a section produced by ultramicrotomy of a grain of the powder obtained in Example 4;

FIG. 7: an SEM micrograph of the powder obtained in Example 5;

FIG. 8: an emission spectrum of the phosphor obtained in Example 9; and

Figure 9:
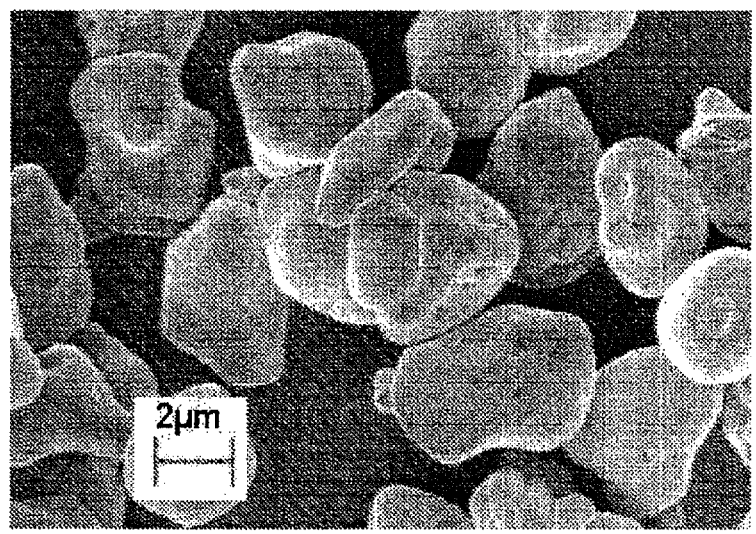

FIG. 9: an SEM micrograph of the phosphor obtained in Example 17.

EXAMPLES

In the following examples, the particles prepared have been characterized in terms of particle size, morphology and composition by the following methods.

Particle Size Measurements

The particle diameters were determined using a laser particle size analyser (Malvern 2000) on a sample of particles dispersed in water and subjected to ultrasound (130 W) for 1 minute 30 seconds.

Electron Microscopy

The transmission electron microscopy micrographs were carried out on a section (microtomy) of the particles, using a high-resolution JEOL 2010 FEG TEM microscope. The spatial resolution of the apparatus for chemical composition measurements by EDS (energy dispersion spectroscopy) was <2 nm. The correlation of the morphologies observed and the chemical compositions measured made it possible to demonstrate the core/shell structure, and to measure the thickness of the shell on the micrographs.

The chemical composition measurements by EDS were carried out by X-ray diffraction analysis on micrographs produced by HAADF-STEM. The measurement corresponded to an average taken over at least two spectra. The spatial resolution for the composition was sufficient to distinguish the core and shell compositions. The contents were estimated in atomic %.

X-Ray Diffraction

The X-ray diffraction diagrams were produced using the $K_\alpha$ line with copper as an anticathode according to the Bragg-Brentano method. The resolution was chosen so as to be sufficient to separate the $LaPO_4$: Ce, Tb and $LaPO_4$ lines, preferably it was $\Delta(2\theta)<0.02°$.

Comparative Example

Reference Precursor According to FR 2 694 299

Added over one hour to 500 ml of a phosphoric acid $H_3PO_4$ solution previously brought to pH 1.6 by addition of ammonium hydroxide and heated to 60° C., were 500 ml of a solution of rare-earth metal nitrates having an overall concentration of 1.5 mol/l and made up as follows: 0.855 mol/l of lanthanum nitrate, 0.435 mol/l of cerium nitrate and 0.21 mol/l of terbium nitrate. The phosphate/rare-earth metal molar ratio was 1.15. The pH during the precipitation was adjusted to 1.6 by addition of ammonium hydroxide.

At the end of the precipitation step, the mixture was again held for 1 h at 60° C. The resulting precipitate was then easily recovered by filtration, washed with water then dried in air at 60° C., then subjected to a heat treatment of 2 h at 900° C. in air. At the end of this step a precursor was obtained of composition $(La_{0.57}Ce_{0.29}Tb_{0.14})PO_4$.

The particle size $D_{50}$ was 4.5 µm, with a dispersion index of 0.4.

Example 1

Synthesis of an $LaPO_4$ Core Precursor

Added over one hour to 500 ml of a phosphoric acid $H_3PO_4$ solution (1.725 mol/l) previously brought to pH 1.6 by addition of ammonium hydroxide, and heated to 60° C., were 500 ml of a lanthanum nitrate solution (1.5 mol/l). The pH during the precipitation was adjusted to 1.6 by addition of ammonium hydroxide.

At the end of the precipitation step, the reaction medium was again held for 1 h at 60° C. The precipitate was then easily recovered by filtration, washed with water, then dried at 60° C. in air. The powder obtained was then subjected to a heat treatment at 900° C. in air.

The product thus obtained, characterized by X-ray diffraction, was a lanthanum orthophosphate $LaPO_4$ of monazite structure. The particle size $D_{50}$ was 5.2 µm, with a dispersion index of 0.6. The specific surface area of the product, measured by BET, was $S_{BET}$=6 m$^2$/g.

Example 2

Synthesis of an $LaPO_4$ Core Precursor

Added over one hour to 500 ml of a phosphoric acid $H_3PO_4$ solution (1.725 mol/l) previously brought to pH 1.9 by addition of ammonium hydroxide, and heated to 60° C., were 500 ml of a lanthanum nitrate solution (1.5 mol/l). The pH during the precipitation was adjusted to 1.9 by addition of ammonium hydroxide.

At the end of the precipitation step, the reaction medium was again held for 1 h at 60° C. The precipitate was then easily recovered by filtration, washed with water, then dried at 60° C. in air. The powder obtained was then subjected to a heat treatment at 900° C. in air.

The product thus obtained, characterized by X-ray diffraction, was a lanthanum orthophosphate $LaPO_4$ of monazite structure. The particle size $D_{50}$ was 4.3 µm, with a dispersion index of 0.4.

The powder was then calcined for 2 h at 1100° C. in air. A rare-earth phosphate of monazite phase having a particle size $D_{50}$ of 4.9 µm, with a dispersion index of 0.4, was then obtained. The BET specific surface area was 3 m$^2$/g.

Example 3

Synthesis of an $LaPO_4$—$LaCeTbPO_4$ Core/Shell Precursor

In a 1 liter beaker, a solution of rare-earth nitrates (Solution A) was prepared as follows: 29.37 g of a 2.8M (d=1.678 g/l) solution of $La(NO_3)_3$, 20.84 g of a 2.88M (d=1.715 g/l) solution of $Ce(NO_3)_3$ and 12.38 g of a 2M (d=1.548 g/l) solution of $Tb(NO_3)_3$ and 462 ml of deionized water were mixed, making a total of 0.1 mol of rare-earth nitrates, of composition $(La_{0.49}Ce_{0.35}Tb_{0.16})(NO_3)_3$.

Introduced into a 2 liter reactor were (Solution B) 340 ml of deionized water, to which 13.27 g of Normapur 85% $H_3PO_4$ (0.115 mol) and then 28% ammonium hydroxide $NH_4OH$ were added, to attain a pH=1.5. The solution was heated to 60° C.

Next, added to the stock thus prepared, were 23.4 g of the lanthanum phosphate from Example 1. The pH was adjusted to 1.5 with 28% $NH_4OH$. The previously prepared solution A was added with stirring to the mixture using a peristaltic pump at 10 ml/min, at temperature (60° C.) and under control of pH=1.5. The mixture obtained was matured for 1 h at 60° C.

At the end of the maturing step, the solution had a milky white appearance. It was left to cool down to 30° C. and the product was drained. It was then filtered over sintered glass and washed with two volumes of water, then dried and calcined for 2 h at 900° C. in air.

A rare-earth phosphate of monazite phase was then obtained having two monazite crystalline phases of separate compositions, namely $LaPO_4$ and $(La, Ce, Tb)PO_4$.

The average particle size $D_{50}$ was 9.0 µm, with a dispersion index of 0.5. The morphology of the particles observed by SEM demonstrated the presence of a core/shell type structure.

A TEM micrograph (FIG. 4) was taken of the resin-coated product prepared by ultramicrotomy (thickness ~100 nm) and placed on a perforated membrane. The particles are seen in cross section. In this micrograph, a particle section can be seen, of which the core is dense and spherical, with an apparent diameter of 0.7 µm. The apparent diameter of the cores in TEM (microtomy) may be smaller than their average diameter when the section is not an equatorial cross section of the particle. The particle had an overall diameter of around 2.7 µm, i.e. an average shell thickness of 1 µm. The measurement of the thickness of the shell is, on the other hand, only slightly affected by the part of the particle where the section is taken. Finally, the sea-urchin morphology of the particles is clearly observed.

Table 1 gives the values, in atomic percentages, found for the elements P, La, Ce and Tb in the particle. The particle had an overall molar composition of rare-earth metals measured by EDS of $La_{0.67}Ce_{0.23}Tb_{0.10}$, namely 11% by weight of terbium oxide ($Tb_4O_7$) relative to the sum of the rare-earth oxides.

TABLE 1

| Chemical composition of the particle | | | | |
| --- | --- | --- | --- | --- |
| Particle | P | La | Ce | Tb |
| Spectrum 1 | 47.0 | 35.6 | 12.2 | 5.3 |
| Spectrum 2 | 46.3 | 35.8 | 12.3 | 5.7 |
| Average | 46.7 | 35.7 | 12.3 | 5.5 |

Table 2 gives the values found for the elements P, La, Ce and Tb in the core. The core had an overall molar composition of rare-earth metals measured by EDS of $La_{0.95}Ce_{0.04}Tb_{0.01}$, namely 1% by weight of terbium oxide ($Tb_4O_7$) relative to the sum of the rare-earth oxides.

TABLE 2

| Chemical composition of the core | | | | |
|---|---|---|---|---|
| Core | P | La | Ce | Tb |
| Spectrum 1 | 47.0 | 51.0 | 1.4 | 0.5 |
| Spectrum 2 | 46.3 | 50.1 | 2.5 | 1.1 |
| Average | 46.7 | 50.5 | 2.0 | 0.9 |

Table 3 gives the values found for the elements P, La, Ce and Tb in the shell. The shell had an overall molar composition of rare-earth metals measured by EDS of $La_{0.46}Ce_{0.37}Tb_{0.17}$, namely 19% by weight of terbium oxide ($Tb_4O_7$) relative to the sum of the rare-earth oxides.

TABLE 3

| Chemical composition of the shell | | | | |
|---|---|---|---|---|
| Shell | P | La | Ce | Tb |
| Spectrum 1 | 48.0 | 24.5 | 19.4 | 8.2 |
| Spectrum 2 | 50.2 | 22.8 | 18.2 | 8.9 |
| Average | 49.1 | 23.7 | 18.8 | 8.6 |

EDS-TEM clearly demonstrates a core/shell structure with a core that is very lightly doped with Tb, and a shell that is highly doped with Tb.

Example 4

Synthesis of an LaPO$_4$—LaCeTbPO$_4$ Core/Shell Precursor

In a 1 liter beaker, a solution of rare-earth nitrates (Solution A) was prepared as follows: 29.37 g of a 2.8M (d=1.678 g/l) solution of $La(NO_3)_3$, 20.84 g of a 2.88M (d=1.715 g/l) solution of $Ce(NO_3)_3$ and 12.38 g of a 2M (d=1.548 g/l) solution of $Tb(NO_3)_3$ and 462 ml of deionized water were mixed, making a total of 0.1 mol of rare-earth nitrates, of composition $(La_{0.49}Ce_{0.35}Tb_{0.16})(NO_3)_3$.

Introduced into a 2 liter reactor were (Solution B) 340 ml of deionized water, to which 13.27 g of Normapur 85% $H_3PO_4$ (0.115 mol) then 28% ammonium hydroxide $NH_4OH$ were added, to attain a pH=1.5. The solution was heated to 60° C. Next, added to the stock thus prepared, were 23.4 g of the lanthanum phosphate from Example 2. The pH was adjusted to 1.5 with 28% $NH_4OH$. The previously prepared solution A was added with stirring to the mixture using a peristaltic pump at 10 ml/min, at temperature (60° C.) and under control of pH=1.5. The mixture obtained was matured for 1 h at 60° C. At the end of the maturing step, the solution had a milky white appearance. It was left to cool down to 30° C. and the product was drained. It was then filtered over sintered glass and washed with two volumes of water, then dried and calcined for 2 h at 900° C. in air.

A rare-earth phosphate of monazite phase having two monazite crystalline phases of separate compositions, namely LaPO$_4$ and (La, Ce, Tb)PO$_4$ was then obtained. The particle size $D_{50}$ was 6.0 µm, with a dispersion index of 0.5.

By SEM observation, the product had a typical dense sea-urchin spine morphology. All the core particles were covered with the layer of LAP. A TEM micrograph (FIG. 6) was taken of the resin-coated product prepared by ultramicrotomy (thickness ~100 nm) and placed on a perforated membrane. The particles are seen in cross section. In this micrograph, a particle section can be seen, of which the core is spherical, with an apparent diameter of 1.9 µm. The apparent diameter of the cores in TEM (microtomy) may appear smaller than their average diameter when the section is not an equatorial cross section of the particle.

The particle had an overall diameter of around 4.2 µm, i.e. an average shell thickness of 1.1 µm. The measurement of the thickness of the shell is, on the other hand, only slightly affected by the part of the particle where the section is taken. Finally, the sea-urchin morphology of the particles is clearly observed (see FIG. 5).

The chemical composition measurements by EDS were carried out by X-ray analysis, on micrographs taken by HAADF-STEM. The contents were estimated in atomic %. The spatial resolution for the composition was <10 nm. The core was clearly identified from the shell by EDS.

Table 4 gives the values found for the elements P, La, Ce and Tb in the core. The core had an overall molar composition measured by EDS of $La_{0.98}Ce_{0.01}Tb_{0.01}$, namely 1 wt % of terbium oxide ($Tb_4O_7$) relative to the sum of the rare-earth oxides.

TABLE 4

| Chemical composition of the core | | | | |
|---|---|---|---|---|
| Core | P | La | Ce | Tb |
| Spectrum 1 | 47.1 | 51.8 | 1.1 | 0.1 |
| Spectrum 2 | 47.6 | 51.3 | 0.3 | 0.8 |
| Average | 47.4 | 51.6 | 0.7 | 0.5 |

Table 5 gives the values found for the elements P, La, Ce and Tb in the shell. The shell had an overall molar composition of rare-earth metals measured by EDS of $La_{0.48}Ce_{0.34}Tb_{0.18}$, namely 20% by weight of terbium oxide ($Tb_4O_7$) relative to the sum of the rare-earth oxides.

TABLE 5

| Chemical composition of the shell | | | | |
|---|---|---|---|---|
| Shell | P | La | Ce | Tb |
| Spectrum 1 | 49.6 | 24.3 | 16.8 | 9.2 |
| Spectrum 2 | 48.2 | 24.8 | 17.9 | 9.2 |
| Average | 48.9 | 24.6 | 16.9 | 9.2 |

EDS-TEM clearly demonstrates a core/shell structure, with a core very lightly doped with Tb, and a shell highly doped with Tb.

Example 5

Synthesis of a LaPO$_4$— LaCeTbPO$_4$ Core/Shell Precursor

In a 1 liter beaker, a solution of rare-earth nitrates (Solution A) was prepared as follows: 146.85 g of a 2.8M (d=1.678 g/l) solution of $La(NO_3)_3$, 104.2 g of a 2.88M (d=1.715 g/l) solution of $Ce(NO_3)_3$ and 61.9 g of a 2M (d=1.548 µl) solution of $Tb(NO_3)_3$ that were made up to 500 ml by addition of deionized water were mixed, making a total of 0.5 mol of rare-earth nitrates, of composition $(La_{0.49}Ce_{0.35}Tb_{0.16})(NO_3)_3$.

Introduced into a 2 liter reactor were (Solution B) 400 ml of deionized water, to which 66.35 g of Normapur 85% $H_3PO_4$ (0.115 mol) and then 28% ammonium hydroxide $NH_4OH$ were added, to attain a pH=1.5. The solution was heated to 60° C.

Next, added to the stock thus prepared, were 125 g of the lanthanum phosphate LaPO$_4$ powder from Example 1. The pH was adjusted to 1.5 with 28% Prolabo Normapur NH$_4$OH. The previously prepared solution A was added with stirring to the mixture using a peristaltic pump at 10 ml/min, at temperature (60° C.) and under control of pH=1.5. The mixture obtained was matured for 1 h at 60° C. At the end of the maturing step, the solution had a milky white appearance. It was left to cool down to 30° C. and the product was drained. It was then filtered over sintered glass and washed with two volumes of water, then dried and calcined for 2 h at 900° C. in air. A rare-earth phosphate of monazite phase was then obtained having two monazite crystalline phases of separate compositions, namely LaPO$_4$ and (La, Ce, Tb)PO$_4$.

The average particle size D$_{50}$ was 6.2 μm, with a dispersion index of 0.5. By SEM observation, the product had a typical spherical and dense cauliflower morphology. All the core particles were covered with the layer of LAP.

Example 6

Production of a Reference LAP Phosphor

The precursor powder obtained in the comparative example was calcined for 2 h at 1000° C. in an Ar/H$_2$ (1% hydrogen) atmosphere. At the end of this step an LAP phosphor was obtained. The average particle size D$_{50}$ was 4.5 μm, with a dispersion index of 0.4.

The composition of the product was (La$_{0.57}$Ce$_{0.29}$Tb$_{0.14}$)PO$_4$, namely 15% by weight of terbium oxide (Tb$_4$O$_7$) relative to the sum of the rare-earth oxides. This corresponded to the use of 110 g of Tb$_4$O$_7$ per kg of final phosphor.

Example 7

Production of an LaPO$_4$— LaCeTbPO$_4$ Core/Shell Phosphor

The precursor powder obtained in Example 3 was calcined for 2 h at 1000° C. in an Ar/H$_2$ (1% hydrogen) atmosphere. At the end of this step a core/shell phosphor was obtained. The average particle size D$_{50}$ was 8.9 μm, with a dispersion index of 0.5.

Example 8

Production of an LaPO$_4$—LaCeTbPO$_4$ Core/Shell Phosphor

The precursor powder obtained in Example 4 was calcined for 2 h at 1000° C. in an Ar/H$_2$ (1% hydrogen) atmosphere. At the end of this step a core/shell phosphor was obtained. The particle size D$_{50}$ was 5.9 μm, with a dispersion index of 0.5.

Example 9

Production of an LaPO$_4$—LaCeTbPO$_4$ Core/Shell Phosphor

The precursor powder obtained in Example 5 was calcined for 2 h at 1000° C. in an Ar/H$_2$ (1% hydrogen) atmosphere. At the end of this step a core/shell phosphor was obtained. The particle size D$_{50}$ was 6.3 μm, with a dispersion index of 0.5.

TABLE 6

| | Photoluminescence yield (PL) | |
| --- | --- | --- |
| | Mass of terbium used | PL |
| Example 6* | 110 g of Tb$_4$O$_7$/kg of final phosphor | 100 |
| Example 7 | 66 g of Tb$_4$O$_7$/kg of final phosphor | 99.8 |
| Example 8 | 66 g of Tb$_4$O$_7$/kg of phosphor | 100.1 |
| Example 9 | 66 g of Tb$_4$O$_7$/kg of phosphor | 100.3 |

*Comparative example

The photoluminescence yield (PL) of the phosphors obtained in Examples 7, 8 and 9 according to the invention was compared with the yield for the phosphor obtained in Example 6, which was taken as a reference, having a photoluminescence yield PL=100. The measurements were carried out by integrating the emission spectrum between 450 nm and 700 nm, under excitation at 254 nm, measured on a Jobin-Yvon spectrophotometer.

FIG. 8 shows an emission spectrum of the phosphor.

Example 10

Synthesis of a YBO$_3$—LaCeTbPO$_4$ Core/Shell Precursor

In a 1 liter beaker, a solution of rare-earth nitrates (Solution A) was prepared as follows: 29.37 g of a 2.8M (d=1.678 g/l) solution of La(NO$_3$)$_3$, 20.84 g of a 2.88M (d=1.715 g/l) solution of Ce(NO$_3$)$_3$ and 12.38 g of a 2M (d=1.548 g/l) solution of Tb(NO$_3$)$_3$ and 462 ml of deionized water were mixed, making a total of 0.1 mol of rare-earth nitrates, of composition (La$_{0.49}$Ce$_{0.35}$Tb$_{0.16}$)(NO$_3$)$_3$.

Introduced into a 2 liter reactor were (Solution B) 340 ml of deionized water, to which 13.27 g of Normapur 85% H$_3$PO$_4$ (0.115 mol) and then 28% ammonium hydroxide NH$_4$OH were added, to attain a pH=1.5. The solution was heated to 70° C.

Next, added to the stock thus prepared, were 23.4 g of an yttrium borate YBO$_3$ of average size, by laser particle size analysis, D$_{50}$=3.2 μm. The pH was adjusted to 2.1 with 28% NH$_4$OH.

The previously prepared solution A was added with stirring to the mixture using a peristaltic pump at 10 ml/min, at temperature (70° C.) and under control of pH=2.1. The mixture obtained was matured for 1 h at 70° C.

At the end of this time, the solution had a milky white appearance. It was left to cool down to 30° C. and the product was drained. It was then filtered over sintered glass and washed with two volumes of water, then dried and calcined for 2 h at 900° C. in air.

A rare-earth phosphate of monazite phase of composition (La, Ce, Tb)PO$_4$, deposited on a YBO$_3$ core, was then obtained.

The average size of the particles, measured by Coulter laser particle size analysis, was 5.1 μm, with a dispersion index of 0.4.

Example 11

This example relates to the preparation of a dense LaPO$_4$ core.

Added over one hour to 500 ml of a phosphoric acid H$_3$PO$_4$ solution (1.725 mol/l) previously brought to pH 1.5 by addition of ammonium hydroxide, and heated to 60° C., were 500 ml of a lanthanum nitrate solution (1.5 mol/l). The pH during the precipitation was adjusted to 1.5 by addition of ammonium hydroxide.

At the end of the precipitation step, the reaction mixture was again held for 1 h at 60° C. The precipitate was then easily recovered by filtration, washed with water, then dried at 60° C. in air. The powder obtained was then subjected to a heat treatment at 900° C. in air.

170 g of this powder was carefully mixed using a Turbulat-type mixer with 1.7 g of LiF for 30 minutes. The mixture was then calcined in a reducing atmosphere (95% Ar/5% $H_2$ mixture) for 2 h at 1000° C. The product obtained was then carefully washed hot (80° C.) in a water/nitric acid mixture.

A rare-earth phosphate ($LaPO_4$) powder of monazite phase, having a particle size $D_{50}$ of 5.6 μm with a dispersion index of 0.6 was thus obtained. The BET specific surface area of the product $S_{BET}$ was 0.6 m²/g.

Example 12

This example also relates to the preparation of a dense $LaPO_4$ core.

Added over one hour to 500 ml of a phosphoric acid $H_3PO_4$ solution (1.725 mol/l) previously brought to pH 1.9 by addition of ammonium hydroxide, and heated to 60° C., were 500 ml of a lanthanum nitrate solution (1.5 mol/l). The pH during the precipitation was adjusted to 1.9 by addition of ammonium hydroxide.

At the end of the precipitation step, the reaction mixture was again held for 1 h at 60° C. The precipitate was then easily recovered by filtration, washed with water, then dried at 60° C. in air. The powder obtained was then subject to a heat treatment at 900° C. in air.

170 g of this powder were carefully mixed using a Turbulat-type mixer with 34 g of NaCl for 30 minutes. The resulting mixture was then calcined at 900° C. for 4 h in air. The product obtained was then washed for 4 h with hot (80° C.) water with stirring, then filtered and dried. The powder was then deagglomerated by ball milling in a rotating jar for 8 hours.

The product thus obtained, characterized by X-ray diffraction, was a lanthanum orthophosphate $LaPO_4$ of monazite structure. The particle size $D_{50}$ was 4.4 μm, with a dispersion index of 0.6.

The BET specific surface area of the product $S_{BET}$ was 0.5 m²/g.

Example 13

Synthesis of an $LaPO_4$/$LaCeTbPO_4$ Core/Shell Precursor on the Core of Example 11

In a 1 liter beaker, a solution of rare-earth nitrates (Solution A) was prepared as follows: 117.48 g of a 2.8M (d=1.678 g/l) solution of $La(NO_3)_3$, 83.36 g of a 2.88M (d=1.715 g/l) solution of $Ce(NO_3)_3$ and 49.52 g of a 2M (d=1.548 g/l) solution of $Tb(NO_3)_3$ and 349 ml of deionized water were mixed, making a total of 0.4 mol of rare-earth nitrates, of composition $(La_{0.49}Ce_{0.35}Tb_{0.16})(NO_3)_3$.

Introduced into a 2 liter reactor were (Solution B) 400 ml of deionized water, to which 53.06 g of Normapur 85% $H_3PO_4$ and then 28% ammonium hydroxide $NH_4OH$ were added, to obtain a pH=1.5. The solution was heated to 60° C. Next, added to the stock thus prepared, were 100 g of the lanthanum phosphate coming from Example 11. The pH was adjusted to 1.5 with 6 mol/l ammonium hydroxide $NH_4OH$. The previously prepared solution A was added with stirring to the mixture using a peristaltic pump at 10 ml/min, at temperature (60° C.) and under control of pH=1.5. The mixture obtained was matured for 1 h at 60° C. At the end of the maturing, the solution had a milky white appearance. It was left to cool down to 30° C. and the product was drained. It was then filtered over sintered glass and washed with two volumes of water, then dried and calcined for 2 h at 900° C. in air.

A rare-earth phosphate of monazite phase, having two monazite crystalline phases of separate compositions, namely $LaPO_4$ and $(La, Ce, Tb)PO_4$, was then obtained. The particle size $D_{50}$ was 9.2 μm, with a dispersion index of 0.5.

Example 14

Synthesis of an $LaPO_4$/$LaCeTbPO_4$ Core/Shell Precursor on the Core of Example 12

In a 1 liter beaker, a solution of rare-earth nitrates (Solution A) was prepared as follows: 146.85 g of a 2.8M (d=1.678 g/l) solution of $La(NO_3)_3$, 104.2 g of a 2.88M (d=1.715 g/l) solution of $Ce(NO_3)_3$ and 61.9 g of a 2M (d=1.548 g/l) solution of $Tb(NO_3)_3$ and 312 ml of deionized water were mixed, making a total 0.5 mol of rare-earth nitrates, of composition $(La_{0.49}Ce_{0.35}Tb_{0.16})(NO_3)_3$.

Introduced into a 2 liter reactor were (Solution B) 400 ml of deionized water, to which 69.2 g of Normapur 85% $H_3PO_4$ (0.6 mol) and then 28% ammonium hydroxide $NH_4OH$ were added, to obtain a pH=1.4. The solution was heated to 60° C. Next, added to the stock thus prepared, were 83 g of the lanthanum phosphate from Example 12. The pH was adjusted to 1.5 with 6 mol/l ammonium hydroxide $NH_4OH$. The previously prepared solution A was added with stirring to the mixture using a peristaltic pump at 10 ml/min, at temperature (60° C.) and under control of pH=1.5. The mixture obtained was matured for 1 h at 60° C. At the end of the maturing step, the solution had a milky white appearance. It was left to cool down to 30° C. and the product was drained. It was then filtered over sintered glass and washed with two volumes of water, then dried and calcined for 2 h at 900° C. in air.

A rare-earth phosphate of monazite phase, having two monazite crystalline phases of separate compositions, namely $LaPO_4$ and $(La, Ce, Tb)PO_4$, was then obtained. The particle size $D_{50}$ was 7.2 μm, with a dispersion index of 0.3.

Example 15

Synthesis of an $LaPO_4$/$LaCeTbPO_4$ Core/Shell Phosphor from the Precursor of Example 3

The precursor powder obtained in Example 3 (200 g) was then carefully mixed using a Turbulat-type mixer for 30 minutes with 1% by weight of $Li_2B_4O_7$ (2 g). This mixture was then calcined in an Ar/$H_2$ (5% hydrogen) atmosphere for 2 h at 1000° C. The product obtained was then washed with hot water, then filtered and dried. After this step, an LAP phosphor was obtained. The average particle size $D_{50}$ was 7.1 μm, with a dispersion index of 0.5.

The composition of the product was $(La_{0.75}Ce_{0.18}Tb_{0.08})PO_4$, i.e. 9% by weight of terbium oxide ($Tb_4O_7$) relative to the sum of the rare-earth oxides.

Example 16

Synthesis of an LaPO$_4$/LaCeTbPO$_4$ Core/Shell Phosphor from the Precursor of Example 13

The precursor powder obtained in Example 13 (150 g) was then carefully mixed using a Turbulat-type mixer for 30 minutes with 1% by weight of Li$_2$B$_4$O$_7$ (1.5 g). This mixture was then calcined in an Ar/H$_2$ (5% hydrogen), atmosphere for 2 h at 1000° C. The product obtained was then washed with hot water, then filtered and dried. After this step, an LAP phosphor was obtained. The average particle size D$_{50}$ was 7.1 μm with a dispersion index of 0.5.

The composition of the product was (La$_{0.75}$Ce$_{0.18}$Tb$_{0.08}$)PO$_4$ i.e. 9% by weight of terbium oxide (Tb$_4$O$_7$) relative to the sum of the rare-earth oxides.

Example 17

Synthesis of an LaPO$_4$/LaCeTbPO$_4$ Core/Shell Phosphor from the Precursor of Example 14

The precursor powder obtained in Example 14 (150 g) was then carefully mixed using a Turbulat-type mixer for 30 minutes with 1% by weight of Li$_2$B$_4$O$_7$ (1.5 g). This mixture was then calcined in an Ar/H$_2$ (5% hydrogen) atmosphere for 2 h at 1000° C. The product obtained was then washed with hot water, then filtered and dried. After this step, an LAP phosphor was obtained. The average particle size D$_{50}$ was 8.1 μm with a dispersion index of 0.4.

The product was subjected to a deagglomeration treatment by ball milling for 20 minutes. The average particle size D$_{50}$ was then 5.7 μm.

The composition of the product was (La$_{0.69}$Ce$_{0.21}$Tb$_{0.10}$)PO$_4$, i.e. 10.8% by weight of terbium oxide (Tb$_4$O$_7$) relative to the sum of the rare-earth oxides.

The photoluminescence yield (PL) of the phosphors obtained in Examples 7, 8 and 9 according to the invention was compared with the yield for the phosphor obtained in Example 6, which was taken as reference, with a photoluminescence yield PL=100. The measurements were carried out by integrating the emission spectrum between 450 nm and 700 nm, under excitation at 254 nm, measured on a Jobin-Yvon spectrophotometer.

FIG. 9 is an SEM micrograph of the phosphor obtained.

Example 18

Synthesis of an Al$_2$O$_3$/LaCeTbPO$_4$ Core/Shell Precursor

In a 1 liter beaker, a solution of rare-earth nitrates (Solution A) was prepared as follows: 146.85 g of a 2.8M (d=1.678 g/l) solution of La(NO$_3$)$_3$, 104.2 g of a 2.88M (d=1.715 g/l) solution of Ce(NO$_3$)$_3$ and 61.9 g of a 2M (d=1.548 g/l) solution of Tb(NO$_3$)$_3$ and 312 ml of deionized water were mixed, making a total of 0.5 mol of rare-earth nitrates, of composition (La$_{0.49}$Ce$_{0.35}$Tb$_{0.16}$)(NO$_3$)$_3$.

Introduced into a 2 liter reactor were (Solution B) 400 ml of deionized water, to which 69.2 g of Normapur 85% H$_3$PO$_4$ (0.6 mol) and then 28% ammonium hydroxide NH$_4$OH were added, to obtain a pH=1.4. The solution was heated to 60° C. Next, added to the stock thus prepared, were 34 g of alpha-alumina (α-Al$_2$O$_3$) with a particle size D$_{50}$ of 4.1 μm and a BET specific surface area of 0.6 m$^2$/g. The pH was adjusted to 1.4 with 6 mol/l ammonium hydroxide NH$_4$OH. The previously prepared solution A was added with stirring to the mixture using a peristaltic pump at 10 ml/min, at temperature (60° C.) and under control of pH=1.4. The mixture obtained was matured for 1 h at 60° C. At the end of the maturing step, the solution had a milky white appearance. It was left to cool down to 30° C. and the product was drained. It was then filtered over sintered glass and washed with two volumes of water, then dried and calcined for 2 h at 900° C. in air.

A mixed alumina/monazite-phase rare-earth phosphate compound, having two crystalline phases of separate compositions, namely Al$_2$O$_3$ and (La, Ce, Tb)PO$_4$, was then obtained. The particle size D$_{50}$ was 7.8 μm, with a dispersion index of 0.4.

Example 19

Synthesis of an Al$_2$O$_3$/LaCeTbPO$_4$ Core/Shell Phosphor from the Precursor of Example 18

The precursor powder obtained in Example 18 (150 g) was then carefully mixed using a Turbulat-type mixer for 30 minutes with 1% by weight of Li$_2$B$_4$O$_7$ (1.5 g). This mixture was then calcined in an Ar/H$_2$ (5% hydrogen) atmosphere for 2 h at 1000° C. The product obtained was then washed with hot water, then filtered and dried. After this step, an LAP phosphor was obtained. The average particle size D$_{50}$ was 8.1 μm, with a dispersion index of 0.4.

The composition of the product was the following: 0.4Al$_2$O$_3$/0.6 (La$_{0.49}$Ce$_{0.35}$Tb$_{0.16}$)PO$_4$.

Example 20

Synthesis of an YBO$_3$—LaCeTbPO$_4$ Core/Shell Precursor

In a 1 liter beaker, a solution of rare-earth nitrates (Solution A) was
prepared as follows: 146.85 g of a 2.8M (d=1.678 g/l) solution of La(NO$_3$)$_3$, 104.2 g of a 2.88M (d=1.715 g/l) solution of Ce(NO$_3$)$_3$ and 61.9 g of a 2M (d=1.548 g/l) solution of Tb(NO$_3$)$_3$ and 312 ml of deionized water were mixed, making a total of 0.5 mol of rare-earth nitrates, of composition (La$_{0.49}$Ce$_{0.35}$Tb$_{0.16}$)(NO$_3$)$_3$.

Introduced into a 2 liter reactor were (Solution B) 400 ml of deionized water, to which 69.2 g of Normapur 85% H$_3$PO$_4$ (0.6 mol) and then 28% ammonium hydroxide NH$_4$OH were added, to obtain a pH=1.4. The solution was heated to 60° C. Next, added to the stock thus prepared, were 48.7 g of yttrium borate YBO$_3$ calcined beforehand at 1000° C. in air in the presence of an excess of boric acid and possessing a particle size D$_{50}$ of 3.1 μm and a BET specific surface area of 0.7 m$^2$/g. The pH was adjusted to 1.6 with 6 mol/l ammonium hydroxide NH$_4$OH. The previously prepared solution A was added with stirring to the mixture using a peristaltic pump at 10 ml/min, at temperature (60° C.) and under control of pH=1.6. The mixture obtained was matured for 1 h at 60° C. At the end of the maturing step, the solution had a milky white appearance. It was left to cool down to 30° C. and the product was drained. It was then filtered over sintered glass and washed with two volumes of water, then dried and calcined for 2 h at 900° C. in air.

A mixed yttrium borate/monazite-phase rare-earth phosphate compound, having two crystalline phases of separate compositions, namely YBO$_3$ and (La, Ce, Tb)PO$_4$, was then obtained. The particle size D$_{50}$ was 5.2 μm, with a dispersion index of 0.4.

Example 21

Formation of a YBO$_3$/LaCeTbPO$_4$ Core/Shell Phosphor from the Precursor of Example 20

The precursor powder obtained in Example 20 (100 g) was then carefully mixed using a Turbulat-type mixer, for 30 minutes, with 1% by weight of Li$_2$B$_4$O$_7$ (1 g). This mixture was then calcined in an Ar/H$_2$ (5% hydrogen) atmosphere for 2 h at 1000° C. The product obtained was then washed with hot water, then filtered and dried. After this step, an LAP phosphor was obtained. The average particle size D$_{50}$ was 8.1 μm, with a dispersion index of 0.4.

The composition of the product was 0.4 YBO$_3$–0.6 (La$_{0.49}$Ce$_{0.35}$Tb$_{0.16}$)PO$_4$.

Example 22

Comparative Example

The precursor powder obtained in the first example given above (comparative example) (170 g) was carefully mixed using a Turbulat-type mixer, for 30 minutes, with 1% by weight of Li$_2$B$_4$O$_7$ (1.7 g). This mixture was then calcined in an Ar/H$_2$ (5% hydrogen) atmosphere for 2 h at 1000° C. The product obtained was then washed with hot water, then filtered and dried. After this step, an LAP phosphor was obtained. The average particle size D$_{50}$ was 5.1 μm, with a dispersion index of 0.5.

The composition of the product was (La$_{0.5}$Ce$_{0.29}$Tb$_{0.14}$)PO$_4$, i.e. 15% by weight of terbium oxide (Tb$_4$O$_7$) relative to the sum of the rare-earth oxides. This composition corresponded to the use of 110 g of Tb$_4$O$_7$ per kg of final phosphor.

Table 7 below indicates the photoluminescence yields (PL) of the phosphors forming the subject of the above examples. The yields are compared with the yield of the phosphor obtained in Example 22, which is taken as reference, having a photoluminescence yield PL=100. The measurements were carried out by integrating the emission spectrum between 450 nm and 700 nm, under excitation at 254 nm, measured on a Jobin-Yvon spectrophotometer.

TABLE 7

|  | Mass of terbium used | PL |
|---|---|---|
| Example 22 | 110 g of Tb$_4$O$_7$/kg of final phosphor. | 100 |
| Example 15 | 66 g of Tb$_4$O$_7$/kg of final phosphor. | 89 |
| Example 16 | 66 g of Tb$_4$O$_7$/kg of phospor | 97 |
| Example 17 | 79.2 g of Tb$_4$O$_7$/kg of phosphor | 100 |
| Example 19 | 99 g of Tb$_4$O$_7$/kg of phosphor | 103 |
| Example 21 | 91 g of Tb$_4$O$_7$/kg of phosphor | 101 |

The invention claimed is:

1. A phosphor precursor (P) comprising particles having an average diameter ranging from 1.5 to 15 microns, the particles comprising:
   a mineral core based on a non-phosphor mineral material a comprising a yttrium, gadolinium or cerium oxide; and
   a shell based on a mixed phosphate of lanthanum and/or cerium, optionally doped with terbium, homogeneously covering the mineral core over a thickness greater than or equal to 300 nm.

2. The phosphor precursor as defined by claim 1, wherein the shell has a thickness from 0.3 to 1 micron.

3. The phosphor precursor as defined by claim 1, wherein the mixed phosphate of the shell has the formula (I) below:

$$La_{(1-x-y)}Ce_xTb_yPO_4 \quad (I)$$

in which:
   x ranges from 0 to 0.95, inclusive;
   y ranges from 0.05 to 0.3, inclusive; and
   the sum (x+y) is less than or equal to 1.

4. The phosphor precursor as defined by claim 3, wherein the mixed phosphate of the shell has the formula (Ia) below:

$$La_{(1-x-y)}Ce_xTb_yPO_4 \quad (Ia)$$

in which:
   x ranges from 0.1 to 0.5, inclusive;
   y ranges from 0.1 to 0.3, inclusive; and
   the sum (x+y) ranges from 0.4 to 0.6.

5. The phosphor precursor as defined by claim 1, wherein the mixed phosphate of the shell has the formula (Ib) below:

$$La_{(1-y)}Tb_yPO_4 \quad (Ib)$$

in which:
   y ranges from 0.05 to 0.3, inclusive;
   or has the following formula (Ic):

$$La_{(1-y)}Ce_yPO_4 \quad (Ic)$$

in which:
   y ranges from 0.01 to 0.3, inclusive.

6. The phosphor precursor as defined by claim 1, wherein the particles have a dispersion index of less than 0.6.

7. The phosphor precursor as defined by claim 1, wherein the mineral core has a specific surface area of at most 1 m$^2$/g.

8. The phosphor precursor as defined by claim 1 wherein the mineral core of the particles has been densified by using the technique of molten salts.

9. A phosphor (L) comprising particles having an average diameter ranging from 1.5 to 15 microns, these particles comprising:
   a mineral core based on a non-phosphor mineral material comprising a yttrium, gadolinium or cerium oxide; and
   a shell based on a mixed phosphate of lanthanum and/or cerium, with the structure of lanthanum phosphate, optionally doped with terbium (LAP), homogeneously covering the mineral core, over a thickness greater than or equal to 300 nm.
   wherein the phosphor has a substantially identical or greater photoluminescence yield and a Tb content at least 5 wt % lower than a mixed phosphate of La and/or Ce doped with Tb having a composition, expressed by weight, of 55% La oxide, 30% Ce oxide and 15% Tb oxide.

10. A phosphor (L) as defined by claim 9, wherein the mixed phosphate of the shell has the general formula (Ia) below:

$$La_{(1-x-y)}Ce_xTb_yPO_4 \quad (Ia)$$

in which:
   x ranges from 0.1 to 0.5, inclusive;
   y ranges from 0.1 to 0.3, inclusive; and
   the sum (x+y) ranges from 0.4 to 0.6.

11. A phosphor (L) as defined by claim 9, wherein the mixed phosphate of the shell has the general formula (Ib) or (Ic) below:

$$La_{(1-y)}Tb_yPO_4 \quad (Ib)$$

in which:
   y ranges from 0.05 to 0.3, inclusive; or $$La_{(1-y)}Ce_yPO_4 \quad (Ic)$$

in which:
y ranges from 0.01 to 0.3, inclusive.

12. A phosphor (L) as defined by claim 9, wherein the mineral core has a specific surface area of at most 1 m$^2$/g.

13. A plasma system, a display screen or a lighting system having a green luminescence provided by a phosphor as defined by claim 9.

14. A UV excitation device, trichromatic lamp, mercury vapor trichromatic lamp, lamp for backlighting liquid crystal systems, plasma screen, xenon excitation lamp, device for excitation by light-emitting diodes or UV excitation marking system, comprising a phosphor as defined by claim 9.

15. A luminescent device having a green luminescence comprising a phosphor (L) as defined by claim 9.

16. A luminescent device as defined by claim 15, comprising a UV excitation device, trichromatic lamp, mercury vapor trichromatic lamp, lamp for backlighting liquid crystal systems, plasma screen, xenon excitation lamp, device for excitation by light-emitting diodes or UV excitation marking system.

17. A process for preparing a phosphor precursor (P) as defined by claim 1, comprising:
  adding, continuously and gradually with stirring, an aqueous solution (s) of soluble lanthanum and/or cerium, and optionally terbium, salts to an aqueous medium (m) having an initial pH (pH$^0$) of 1 to 5 and initially comprising:
    particles (p$^0$) based on a mineral material, in the dispersed state; and
    phosphate ions,
  maintaining the pH of the reaction medium at an approximately constant value during precipitation of the mixed phosphate, with variations in the pH of at most 0.5 pH units, whereby particles are obtained that comprise a core based on a non-phosphor mineral material, comprising a tyyrium, gadolinium or cerium oxide, deposited at the of which is a mixed phosphate of lanthanum and/or cerium, and optionally terbium, and
  (B) separating from the particles obtained from the reaction medium, and heat treating then at a temperature of 400° to 900° C.

18. The process as defined by claim 17, wherein the particles (p$^0$) are particles of isotropic morphology.

19. The process as defined by claim 17, wherein the particles (p$^0$) have an average diameter ranging from 0.5 to 14 microns.

20. The process as defined by claim 17, wherein the particles (p$^0$) have a dispersion index of less than 0.6.

21. The process as defined by claim 18, wherein the particles (p$^0$) are approximately spherical.

22. The process as defined by claim 17, wherein, the phosphate ions are initially present in the aqueous medium (m) in the form of ammonium phosphates.

23. The process as defined by claim 17, wherein, the phosphate ions are introduced in a stoichiometric excess into the aqueous medium (m), with an initial phosphate/(La+Ce+Tb) molar ratio greater than 1.

24. The process as defined by claim 17, further comprising maturing the reaction medium after the addition of all of the solution(s) and prior separating the particles.

25. The process as defined by claim 17, wherein the particles (p$^0$) have a specific surface area of at most 1 m$^2$/g.

26. A process for preparing a phosphor (L) from a precursor (P) as defined by claim 1, which comprises a step (C) in which:
  (C) said precursor (P) is heat-treated at a temperature above 900° C.

* * * * *